(12) United States Patent
Tsai et al.

(10) Patent No.: US 7,937,662 B2
(45) Date of Patent: May 3, 2011

(54) SYSTEM AND METHOD FOR IMPLEMENTING REMOTE CONTROL FUNCTIONS IN A MOUSE IN A VIDEO PLAYBACK SYSTEM

(75) Inventors: Yi-Chao Tsai, Taipei (TW); Fu-Kai Juang, Taipei (TW); Chi-Han Peng, Sindian (TW)

(73) Assignee: Cyberlink Corp., Shindian, Taipei (TW)

( * ) Notice: Subject to any disclaimer, the term of this patent is extended or adjusted under 35 U.S.C. 154(b) by 72 days.

(21) Appl. No.: 11/556,797

(22) Filed: Nov. 6, 2006

(65) Prior Publication Data

US 2008/0022219 A1  Jan. 24, 2008

Related U.S. Application Data

(60) Provisional application No. 60/807,941, filed on Jul. 21, 2006.

(51) Int. Cl.
*G06F 3/00* (2006.01)
(52) U.S. Cl. .......................... 715/719; 715/716
(58) Field of Classification Search .................. 715/719, 715/716
See application file for complete search history.

(56) References Cited

U.S. PATENT DOCUMENTS

| | | | | |
|---|---|---|---|---|
| 5,565,888 A * | 10/1996 | Selker | | 715/823 |
| 5,760,773 A * | 6/1998 | Berman et al. | | 715/808 |
| 5,828,376 A * | 10/1998 | Solimene et al. | | 715/821 |
| 6,058,417 A * | 5/2000 | Hess et al. | | 709/219 |
| 6,212,512 B1 * | 4/2001 | Barney et al. | | 707/1 |
| 6,246,411 B1 * | 6/2001 | Strauss | | 715/863 |
| 6,272,286 B1 * | 8/2001 | Asada et al. | | 386/126 |
| 6,357,042 B2 * | 3/2002 | Srinivasan et al. | | 725/32 |
| 6,484,149 B1 * | 11/2002 | Jammes et al. | | 705/26 |
| 6,693,653 B1 * | 2/2004 | Pauly | | 715/857 |
| 6,915,490 B1 * | 7/2005 | Ewing | | 715/794 |
| 7,185,290 B2 * | 2/2007 | Cadiz et al. | | 715/838 |
| 7,397,464 B1 * | 7/2008 | Robbins et al. | | 345/173 |
| 2003/0004853 A1 * | 1/2003 | Ram et al. | | 705/37 |
| 2003/0081009 A1 * | 5/2003 | Seo | | 345/812 |
| 2005/0157599 A1 * | 7/2005 | Kiyama et al. | | 369/30.03 |
| 2006/0007129 A1 * | 1/2006 | Pletikosa | | 345/156 |
| 2006/0020538 A1 * | 1/2006 | Ram et al. | | 705/37 |
| 2006/0075342 A1 * | 4/2006 | Penning | | 715/704 |
| 2007/0061629 A1 * | 3/2007 | Thums et al. | | 714/39 |

\* cited by examiner

*Primary Examiner* — William L Bashore
*Assistant Examiner* — David Phantana-angkool
(74) *Attorney, Agent, or Firm* — Thomas, Kayden, Horstemeyer & Risley, LLP

(57) ABSTRACT

A method for implementing remote control functionality with a mouse in a video playback system includes the steps of identifying all selectable buttons within the page, depressing a key on a mouse device while the mouse is positioned over a first button currently selected, dragging the mouse device in the direction of a second button to be selected while depressing the key, and releasing the key on the mouse device once the mouse device is positioned over the second button to select the second button.

31 Claims, 9 Drawing Sheets

Button State Transition Diagram

SYSTEM AND METHOD FOR IMPLEMENTING REMOTE CONTROL FUNCTIONS IN A MOUSE IN A VIDEO PLAYBACK SYSTEM

CROSS-REFERENCE TO RELATED APPLICATION

This application claims priority to, and the benefit of, U.S. Provisional Patent Application Ser. No. 60/807,941, filed on Jul. 21, 2006, which is incorporated by reference in its entirety.

TECHNICAL FIELD

The present disclosure is generally related to implementation of remote control functions in input/output devices in a video playback system and, more particularly, is related to a system and method for implementing remote control functionality with a mouse in a video playback system.

BACKGROUND

Video playback systems are well known, and there are a variety of current standards that govern the format and other attributes associated with the various video playback systems. Today, the DVD (Digital Video Disc) standard is the predominant format utilized for optical disc storage because of its high storage capacity, thus enabling high quality video and audio to be stored. Consequently, media content such as movies, television shows, and music videos are made widely available in DVD format. One of the appealing aspects of DVDs over other storage formats such as VHS tapes (Video Home System) is the interactive menu(s) offered on DVDs in addition to the movie itself. These interactive menus have become an integral part in fully enjoying media content, such as a movie or television show on a DVD. For example, now, in addition to watching a movie, consumers can select specific chapters to view, set audio/video options (language for the movie to be played in, subtitles, etc.), and even watch additional footage such as a "behind-the-scenes" look in making the movie. Some DVDs even offer "alternate endings" where consumers can actually select an ending of their choice should they not like the original ending. Since DVD players first became available to consumers in the mid to late 1990's, DVD players are common in many households. This is due in part to the drop in cost of DVD players, therefore making them affordable to consumers. Furthermore, today most personal desktop and laptop computers are sold with a DVD-ROM player built in, making DVD players even more widespread and even more portable than before.

Typically, with a conventional stand-alone DVD player (e.g., a player not integrated into a computer system and one that requires a separate display device such as a television), the DVD player will come with a remote control which the consumer uses to access features offered by a DVD. With this remote control, the consumer is able to navigate through the hierarchy of interactive menus a particular DVD might offer. A typical remote control for a DVD player will include a set of up/down and left/right arrows. Some remote controls might include a SELECT button in the middle of an arrangement of up/down, left/right navigational buttons. The navigational buttons allows users to intuitively move more around within a menu. For example, in a screen allowing the user to select a specific chapter to view, a series of thumbnail screen shots might be shown on the screen in a grid arrangement (e.g., in a 2×2 arrangement). A particular thumbnail, say the upper left thumbnail on the screen, might be selected by default and highlighted. From there, the user would simply use the up/down, left/right navigational buttons to highlight a different thumbnail until the desired thumbnail is highlighted. The user might then press the SELECT button to enter his selection. Based on this, the corresponding chapter in the movie will be played.

With DVD players integrated into desktop computers or laptops, the user will generally rely on a graphical user interface (GUI) instead of a remote control to navigate through the series of menus within a DVD. The GUI will generally emulate the same functionality as a remote control. For example, the user can still select chapters to view, fast forward, reverse, set audio/video options, etc. However, instead of navigating through a menu using a series of up/down, left/right selections, the user might click a button shown on the screen using an input device such as a mouse or touch pad on a laptop.

Today, there are various standards in consideration to become the successor to the DVD standard. Two formats competing to become the next generation optical standard are Blu-ray Disc and HD DVD (High Definition Digital Video Disc). As with these newer standards, Blu-ray Disc offers advantages over DVDs and other previous optical standards in various ways including increased storage capacity and enhanced interactivity (disc content authoring, seamless menu navigation, network/Internet connectivity, etc.). The Blu-ray Disc framework offers content providers almost unlimited functionality when creating interactive titles. The author has complete freedom in designing the user interface, which is controllable by using standard navigational buttons on a remote control.

With DVDs, playback is interrupted each time a new menu screen is called. For example, if a user desires to change the language from English to French while watching the movie, the user has to select the audio menu. This, however, causes the movie to stop playing, and a menu is displayed for the user to select from. Upon making his selection, the user then returns back to viewing the movie. Due to Blu-ray Disc's ability to read data from the disc without interrupting the current audio/video stream, various menus can be displayed while the movie is playing. Furthermore, the menus may consist of several pages. Users will be able to browse through various pages of menu selections without interrupting the movie.

Also with DVDs, user browsable slideshows were not possible with uninterrupted audio. As a result of Blu-ray Disc's ability to read data from the disc without interrupting the current audio/video stream, users can browse through various still pictures (e.g., snapshots of various scenes in the movie) while the audio remains playing. This applies not only to forward and backward selections: A user can make different selections on what picture to view (or select from a screen presented with thumbnail images) while the audio remains playing. With DVDs, subtitles were stored in the audio/video stream, and therefore they had limitations on the number of languages and display styles. Again, it is due to Blu-ray Disc's ability to read data from the disc without interrupting the current audio/video stream, that subtitles can be stored independently on the disc. A user may select different font styles, sizes and colors for the subtitles, or location on screen, depending on the disc's offerings. Subtitles can be animated, scrolled or faded in and out.

As with the Blu-ray Disc standard, new features have also been added to the new HD DVD standard which provide for enhanced interactive features over DVDs. The HD DVD framework also allows interactive content to be authored for discs.

Regardless of the particular standard, newer-generation video standards such as Blu-ray Disc and HD DVD are providing greater levels of user control and interactivity with the underlying video content. One area embodying such interactivity relates to the presentation and utilization of buttons. As is known, in interactive graphics, a menu contains one or more pages. Similarly, a page contains one or more buttons, and a button is defined by coordinates (e.g., x-y coordinates), a graphical object, and one or more associated commands. For example, in the context of a DVD video, a user is typically provided with various functions, such as a scene-selection function. In this function, a user may be presented with a variety of single image graphics, which are taken from, and associated with, each of a plurality of scenes. By using the remote control for the DVD player, the user may highlight, or select, any of these images, and may further instruct the DVD player to proceed directly to a given scene by activating the corresponding highlighted image.

From a more technical standpoint, these images, as seen by the user, are provided in the form of mechanisms called "buttons." As mentioned above, each such button is defined by coordinates (e.g., the x and y location where the button will be presented on the screen), a graphic object (i.e., the image that is presented to the user), and one or more associated commands (e.g., a command that directs the DVD player to jump or skip directly to a selected scene).

Reference is now made to FIG. 1, which depicts an exemplary multi-page menu within a video playback system, such as a DVD player. A user typically navigates through the various pages using a remote control. When a user inserts a video disc (e.g., a DVD video), a main menu may be presented on a first page 102 to a user displaying "Main Menu" 104, "Languages" 106, and "Chapters" 108. Using the arrow keys on a remote control for the DVD player, the user may highlight the button for the "Languages" menu 106 option. Once highlighted, the user may press the SELECT key on the remote control, which causes a second page 110 to be presented to the user, having a heading of "Languages" 112. Underneath this heading, a series of buttons may be presented for each language of the associated audio. The languages illustrated in FIG. 1 are "English" 114 and "French" 116.

Alternatively, and as indicated in FIG. 1, if the user highlighted and activated the "Chapters" button 108 from the first page 102, then the third page 118 is presented to the user. As illustrated, this third page includes a heading of "Chapter 1" 120 along with four additional buttons labeled as "Scene 1" 122, "Scene 2" 124, "Main" 126, and "Next" 128. Again, the user may navigate these buttons using the arrow keys on the remote control to highlight any of these buttons. Once highlighted, the user may press a SELECT key provided on the remote control to activate the given button. For example, and as illustrated in the figure, if the user were to activate the "Next" button 128, then the menu would proceed to display a fourth page 132 (presenting image buttons for "Scene 3" 134 and "Scene 4" 136 to the user). As is known, new video standards provide for these and other robust interactive features, which have generally enhanced the user's experience with the graphics medium.

Notwithstanding these enhanced features, however, certain problems have been found to arise. One example where such problems have been found to arise is in the use of computers (rather than designated video players) to display or view the videos. Specifically, a problem arises when using standard input/output devices of a computer, such as a mouse, to interact with the video content, instead of using the remote control that is provided with a dedicated video player (e.g., DVD player). When the same video disc is being executed or displayed on a computer, it has been found that a user may freely select otherwise non-selectable buttons, simply by moving the mouse over the top of the button. Returning to the example presented above, if the user were to move the mouse across the "Languages" button 112 on the second page 110, this would result in an unintended operation. Depending on how the underlying computer program handled it, various different and unintended results could occur. For example, the button may be presented in a highlighted fashion to the user. However, when the user left-clicks the mouse to activate the button, the video program may do nothing as the video disc does not intend that button to be one that can be selected or activated from that page. As an example, in the second page 110, the "Languages" button 112 is not intended to be selectable as denoted by the dotted lines. Only the two buttons below this button ("English" 114 and "French" 116) are meant to be selectable. Attempting to activate the "Languages" 112 button in this case could cause the computer program to crash, depending on how the underlying application processes the selection request.

For purposes of providing nomenclature herein, a button, typically, has one of four possible states. Reference is now made to FIG. 2, which depicts the different states for buttons within a video playback system. These states include a "disabled" state 202, a "normal" state 204, a "selected" state 206, and an "activated" state 208. Referring back to FIG. 1, for the second page 110 being displayed, the "Languages" 112 button would be in a disabled state, as the underlying video content software does not intend for that button to be selected from that particular page. (This is denoted by the dotted line around the button.) The "French" button 114 is in the normal state, while the "English" button 114 is in the selected state. When the user clicks the left mouse key, when the mouse pointer is overlying a selected button, or when the user presses the SELECT key of a remote control for a selected button, then that selected button becomes activated and therefore enters the activated state 208. The activated state 208 is a temporary state, which typically leaves the underlying video content or software to execute the one or more commands that are associated with the button.

As illustrated in FIG. 2, from the activated state 208, a button may proceed to any of the other three possible states. Again in FIG. 1, for the first page the "Languages" button 106 is selected. Upon activation of the "Languages" button 106, the associated command causes, among other possible operations, the menu to proceed to the second page 110. At this time, the "Languages" button 112 enters the disabled state, as it is not intended for selection from this page of the menu. To provide a specific illustration, and returning to FIG. 1, in the last three pages (of the four pages presented in the figure), the top-most button may be a non-selectable button. That is, in the second page 110, the figure illustrates three buttons of "Languages" 112, "English" 114, and "French" 116. The system, however, may be designed to only permit the user to select the buttons of "English" 114 and "French" 116. In this regard, the "Languages" button may be a non-selectable button. Thus, when the "English" 114 is highlighted, and the user depresses the up arrow key on the remote control the "Languages" will not be highlighted or selected when a user interacts with the video disc using the remote control of the dedicated video disc player.

Such features may be implemented, in part, through certain properties of buttons, such as a "neighbor" property. As is known, and defined by certain video specifications (e.g., Blu-ray Disc specification) a button may be defined to have neighbors to the left and right or top and bottom. In such a situation, when a given button is selected (e.g., highlighted)

pressing any of the up-arrow, down-arrow, left-arrow, or right-arrow button on the remote control operates to select, or highlight, the button that is defined to the be neighbor of the selected button in the direction selected by the remote control. However, it is not required that neighbors be so associated with buttons in any given direction (or even at all). Therefore, in returning to the figure, it may be that only the "French" button 116 is associated with the "English" button 114 as a neighbor. Therefore, when the "English" button 114 is selected, only the down-arrow key will be recognized as a valid or legitimate arrow-key input (e.g., other arrow keys are ignored). This way, the user is not permitted to select, with the remote control, any button presented on the screen that is not intended for selection in the current page or context of the video presentation.

However, when the same video disc is being executed or displayed on a computer, it has been found that a user may freely select otherwise non-selectable buttons, simply by moving the mouse over the top of the button. Returning to the example presented above, if the user were to move the mouse across the "Languages" button 112, this would result in an unintended operation. Depending on how the underlying computer program handled it, various different and unintended results could occur. For example, the button may be presented in a highlighted fashion to the user. However, when the user left-clicks the mouse to activate the button, the video program may do nothing (as the video disc does not intend that button to be one that can be selected or activated from that page). Alternatively, attempting to active such a button could cause the computer program to crash.

An example of another issue when attempting to use a mouse or other computer input device arises when two buttons are overlaid with each other. When playing a video disc using a computer and while interfacing with the interactive video disc using an input device such as a mouse, problems may arise. As noted above, one problem may be that the system generates errors or confusing results when the mouse is moved over any of buttons in a normal state, but not intended for selection. In addition, when using the mouse to select the overlaid buttons, the user does not have a ready means for toggling between those two buttons, since they are displayed in identical locations on the screen. In this regard, pressing the mouse key will select whichever of those buttons is currently highlighted, but will not permit the user to toggle to the other button, since the mouse does not have a key corresponding the left-arrow or right-arrow keys of the remote control.

Yet another issue or problem arises in connection with the use of "transparent" buttons or buttons that are too small in size. Transparent buttons are sometimes used as a convenient tool to provide an action when a user depresses a certain button on the remote control input device, without visibly presenting the button to the user. Because these buttons may not be visible to the user, it is not feasible for a user to use a mouse to select these buttons because the precise location is not known.

The foregoing presents just a few examples of situations in which interactive video graphics are provided which require handling beyond the conventional "point-and-click" action of a mouse. Accordingly, solutions to these and other similar problems are desired. One key aspect of embodiments of the present invention is the detection and identification of buttons that require special handling beyond conventional means of selecting buttons with a mouse.

Therefore, there exists a need, among others, for providing users with the ability to utilize the interactive graphics within video content using standard input/output devices of a computer. Broadly, the embodiments of the present invention provide robust or effective solutions or workarounds to the problematic issues that arise in connection with buttons in pages within an interactive video playback system.

SUMMARY

Briefly described, one embodiment, among others, directed to a method for implementing remote control functions with a mouse in a video playback system. One embodiment among others, includes the steps of identifying all selectable buttons within the page, depressing a key on a mouse device while the mouse is positioned over a first button currently selected, dragging the mouse device in the direction of a second button to be selected while depressing the key, and releasing the key on the mouse device once the mouse device is positioned over the second button to select the second button.

Another embodiment includes the steps of identifying all selectable buttons within the page, visibly distinguishing a first button in a selected state among the selectable buttons, dragging a mouse device in the direction of a second button to be selected, and ceasing movement of the mouse device when the second button is selected.

Another embodiment includes the steps of identifying all selectable buttons within the page, visibly distinguishing a first button in a selected state among the selectable buttons, rotating a wheel on the mouse device to select a second button in a direction that is correlated to the position of a second button with respect to the first button, and ceasing rotation of the wheel when the second button is selected.

Another embodiment includes the steps of identifying all selectable buttons within the page, positioning a mouse device over one of the selectable buttons, and displaying a context menu upon depressing a key on the mouse device, the context menu presenting the user with possible actions that can be performed in relation to the button.

Another embodiment includes the steps of identifying all selectable buttons within the page, determining the properties for each selectable button within the page, overlaying a graphic display over each selectable button, the graphic display presenting to the user all available actions that can be performed in relation to the button based on the properties of the button.

Yet another embodiment includes the steps of identifying all selectable buttons within the page, visibly distinguishing a first button in a selected state among the selectable buttons, and dragging a mouse device in a circular fashion in the clockwise direction to select a neighboring button on one side of the first button.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of a system for implementing remote control functions through a mouse in a video playback system and the underlying methods can be better understood with reference to the following drawings. The components in the drawings are not necessarily to scale, emphasis instead being placed upon clearly illustrating the principles of remote video editing system. Moreover, in the drawings, like reference numerals designate corresponding parts throughout the several views.

DETAILED DESCRIPTION

Figure 1:
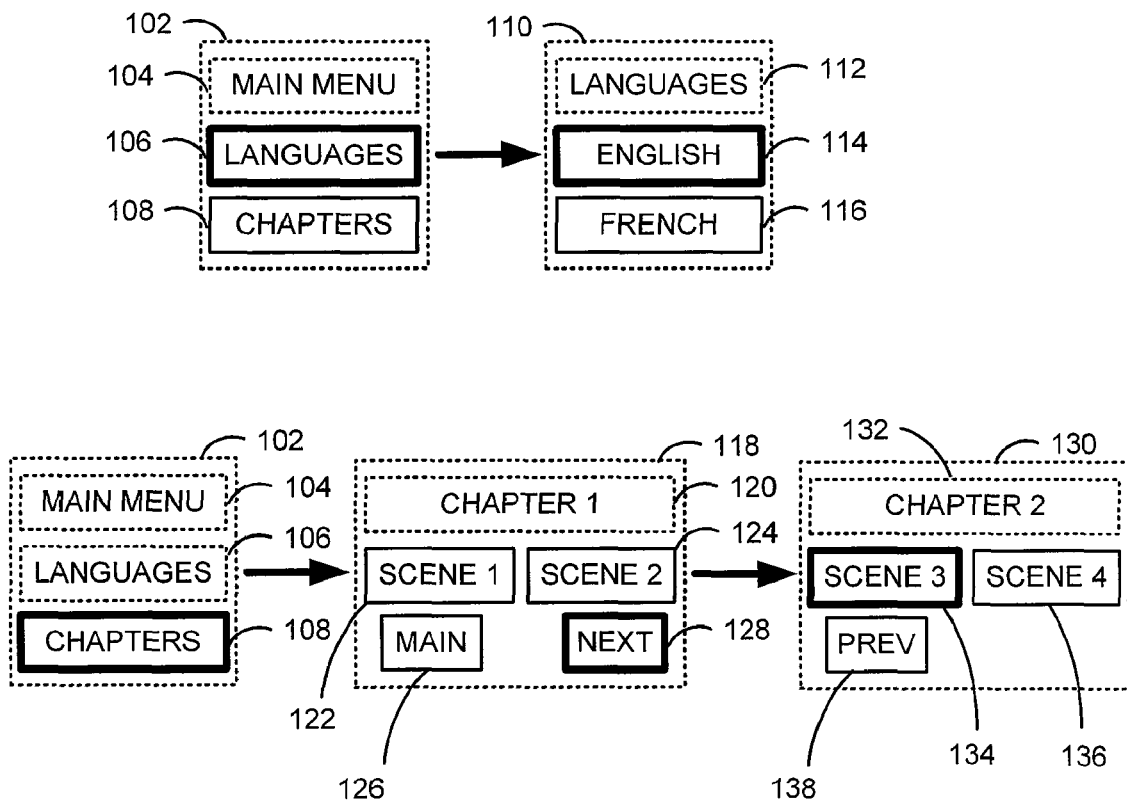
FIG. 1 depicts an exemplary multi-page menu within a video playback system.
Figure 2:
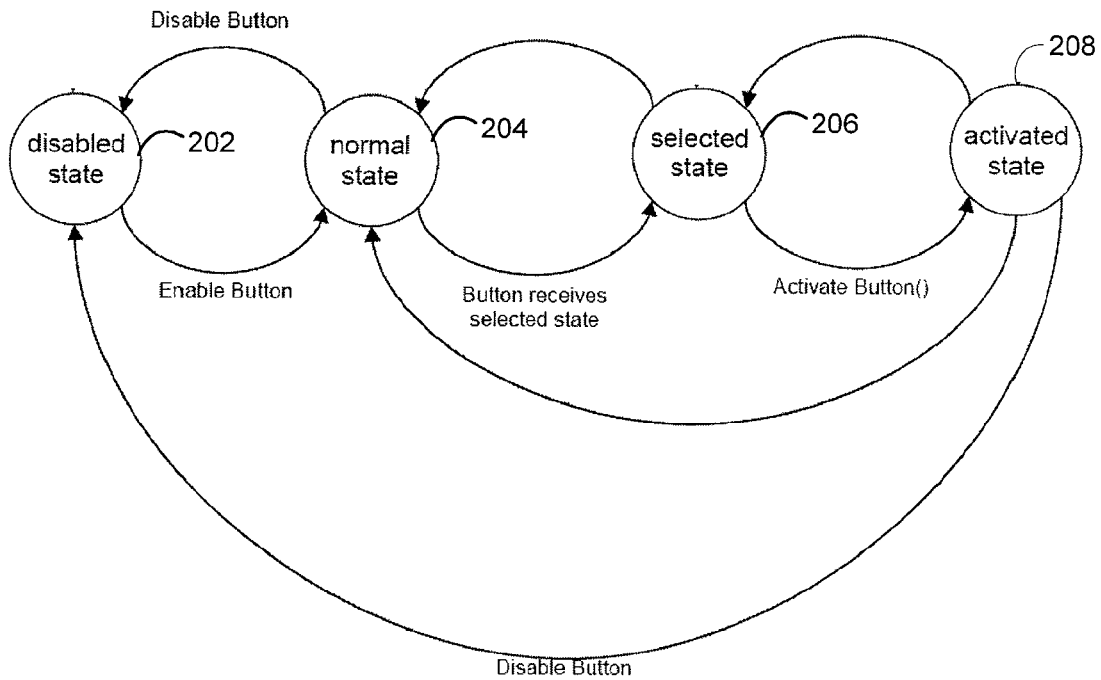
FIG. 2 depicts the different states for buttons within a video playback system.

Having summarized various aspects of the present disclosure, reference will now be made in detail to the description of the disclosure as illustrated in the drawings. While the disclosure will be described in connection with these drawings, there is no intent to limit it to the embodiment or embodiments disclosed herein. On the contrary, the intent is to cover all alternatives, modifications and equivalents included within the spirit and scope of the disclosure as defined by the appended claims.

In one implementation of the present invention, such an embodiment operates on a page-by-page basis. As each new page is accessed or presented, the embodiment scans or searches the page to detect buttons that cannot be selected through conventional means and that require an alternate means of selecting the buttons. Such buttons may be defined by any of a variety of conditions, including, but not limited to: (1) two buttons corresponding to different actions that are directly overlaid on top of each other; (2) buttons that are transparent and hence not visible to the user; and (3) buttons that fall below a pre-defined minimum size such that the buttons are not visible to the user. It will be appreciated that, based upon video standards, which now exist or may be developed in the future, other circumstances or conditions may likewise be identifiable which require an alternate means of selecting buttons. Therefore, the present invention should not be deemed as limited to merely detecting one of the three conditions listed above. Instead, these conditions have been illustrated simply as exemplary in the context of the broader operational aspect of detecting buttons within pages of a video playback system.

Once detected, embodiments of the present invention then implement various solutions for handling, or permitting user interaction with buttons within a page in a video playback system. These solutions may vary from embodiment to embodiment and likewise may vary based on the context in which such buttons are detected. For example, transparent buttons that are detected may be handled or implemented differently than buttons detected due to a mismatch between the logical relationship with a selected button and a physical or dimensional relationship with that selected button (e.g., where multiple buttons corresponding to different actions are overlaid on top of each other). Again, various solutions or handling operations may be implemented consistent with the scope and spirit of the present invention. Several, non-limiting examples are presented below.

With regard to the first condition listed above, there should generally be a match between the logical relationship between two buttons and the physical location between two buttons. In this regard, when visibly selectable buttons are presented on a page, the user would naturally press a corresponding arrow key of the remote control to select and/or activate a given button, in relation to a currently-selected button. When, however, there is a mismatch between such relationships, that mismatch sometimes results in circumstances where buttons are directly overlaid or when transparent buttons are provided. In either situation, the positionally mismatched buttons must first be identified and then handled appropriately.

Figure 3A:
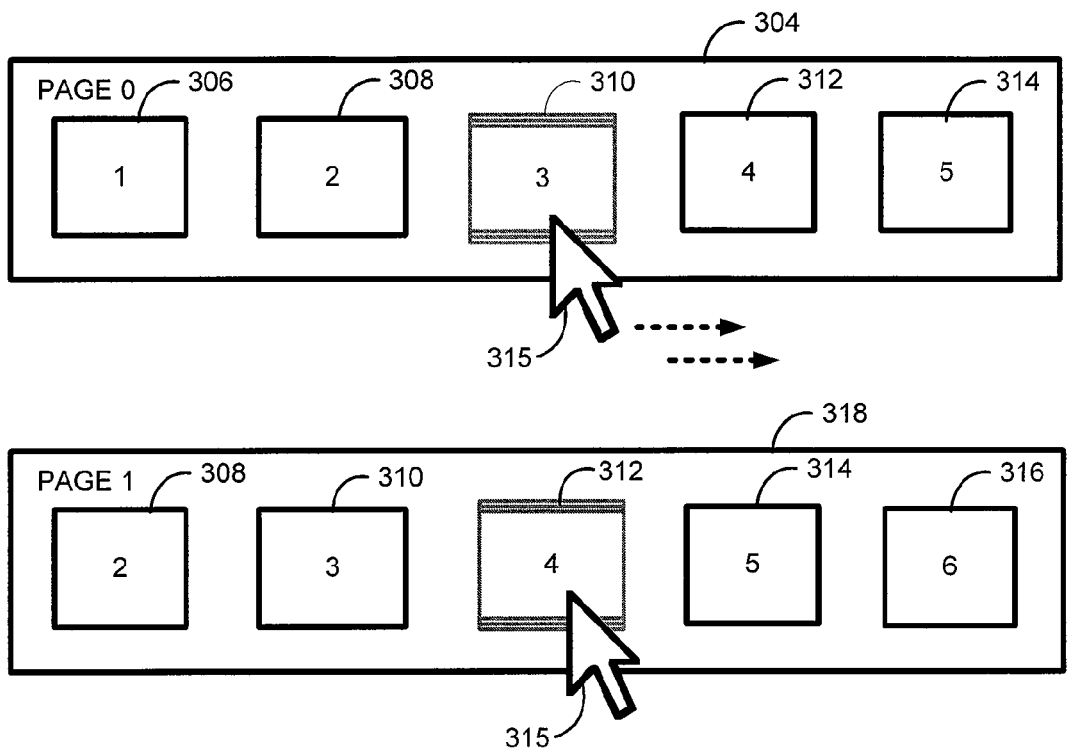
FIG. 3A illustrates the basic operation of selecting a button within a multi-page menu by dragging a mouse.

Reference is first made to FIG. 3A, which illustrates the basic operation of selecting a button within a multi-page menu by dragging a mouse. Consider a situation in which a "Page 0" 304 displays five buttons 306, 308, 310, 312, 314, with the third button 310 currently selected. Furthermore, assume that the third button 310 defines the second button 308 as a left neighbor and the fourth button 312 as a right neighbor. With the third button 310 selected, dragging the mouse pointer 315 in either the left or right directions will result in selection of the corresponding neighbor. Therefore, if the mouse pointer 315 is dragged to the right as illustrated in FIG. 3, the resulting operation may be the presentation of "Page 1" 318, which now shows the fourth button 312 as being selected. From this page, selection of button three 310 or five 314 may be accomplished either to the left or right, in a similar fashion. Similar operations could likewise be implemented by dragging operations in the up or down directions as well.

Figure 3B:
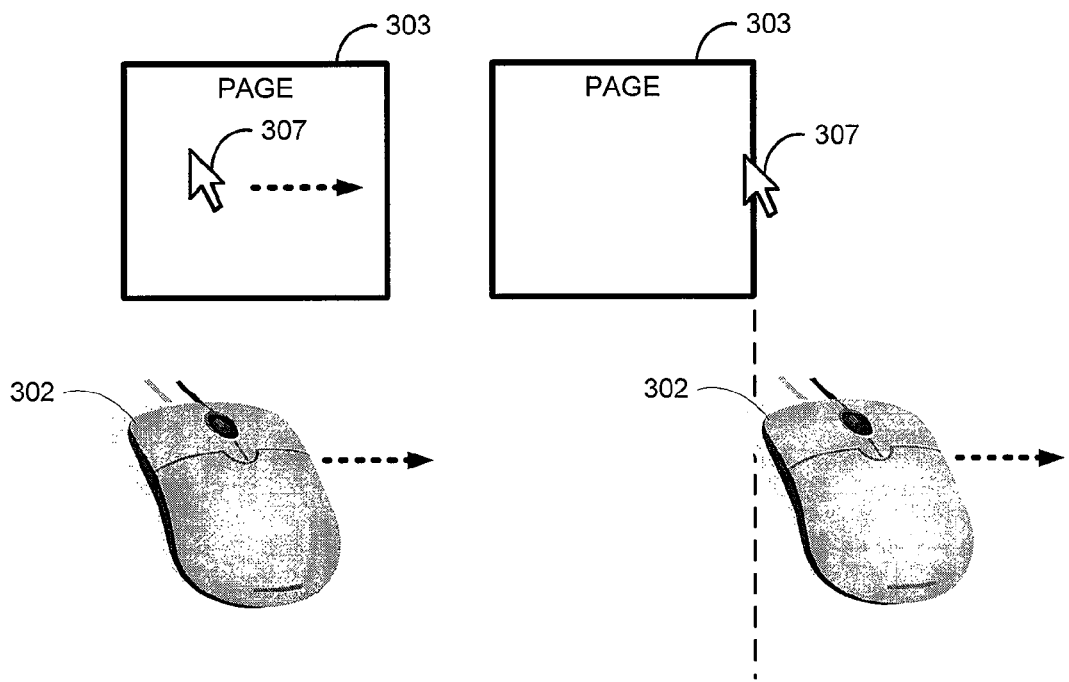
FIG. 3B depicts one embodiment of the present invention for making a selection within a multi-page menu by dragging the mouse beyond one edge of the page.

Reference is now made to FIG. 3B, which depicts one embodiment of the present invention for making a selection within a multi-page menu by dragging the mouse beyond one edge of the page. In one embodiment of the present invention, buttons are not selected until the mouse 302 is dragged in such a way that the mouse pointer 307 is positioned along one of the edges of a give page 303. This is illustrated in FIG. 3B where the mouse pointer 307 has been dragged to the rightmost edge of the page 303. At this point, any further dragging of the mouse 302 would result in selections being made in the manner discussed in the preceding paragraph. In this case, buttons to the right of a currently selected button would be selected. If the user wanted to select buttons above the currently selected button, he would simply drag the mouse 302 until the mouse pointer 307 is positioned along the top edge of the page 303. At this point, any further dragging of the mouse 302 would result in selections being made.

Figure 3C:
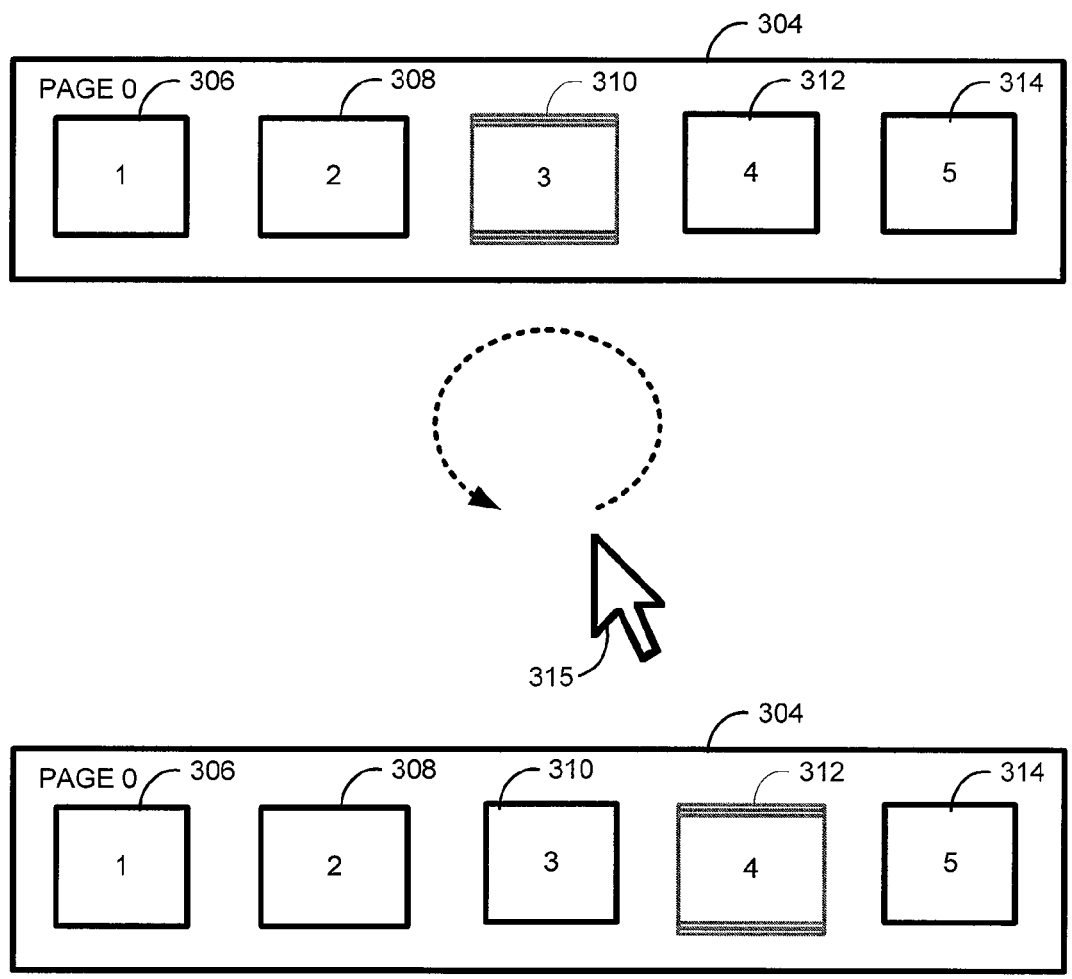
FIG. 3C depicts one embodiment of the present invention for making a selection within a multi-page menu by dragging the mouse in a circular motion.

Reference is now made to FIG. 3C which depicts another embodiment of the present invention for making a selection within a multi-page menu by dragging the mouse in a circular motion. For certain embodiments of the present invention, the functionality of left and right keys on a remote control may be implemented by dragging the mouse in a circular fashion. By way of example, moving the mouse in a circular motion in the clockwise direction would be comparable to pressing the left key on a remote control. Hence, a left neighboring button would be selected. Likewise, moving the mouse in a circular motion in the counter-clockwise direction would be comparable to pressing the right key on a remote control. By way of example, FIG. 3C shows the same page from FIG. 3A where a "Page 0" 304 is presented. "Page 0" 304 displays five buttons 306, 308, 310, 312, 314, with the third button 310 currently selected. Furthermore, assume again that the third button 310 defines the second button 308 as a left neighbor and the fourth button 312 as a right neighbor. With the third button 310 selected, dragging the mouse 315 in a counter-clockwise fashion would emulate the right key being pressed on a remote control. Hence, the fourth button 312, which is the right neighbor of the third button 310, would be selected as shown in FIG. 3C.

In other embodiments of the present invention, the mouse pointer may be hidden from the user's view when any movement is made by the mouse. This avoids confusing the user and avoids any unexpected mouse operations on buttons within the page. In this instance, the user would only see successive buttons being selected (e.g., highlighted) as the mouse is dragged in a particular direction. When the desired button is selected, the user would simply click on one of the mouse buttons to activate the button.

In yet another embodiment of the present invention, neighboring buttons are selected only when a pre-determined number of pixels on the page have been traversed by the mouse pointer. For example, a button adjacent to a currently selected button would be selected when 10 pixels on the page have been traversed by the mouse pointer. Any movement of the mouse less than 10 pixels would result in no selections being made. To select the button after that would require movement of the mouse of at least 20 pixels and so on. In yet another embodiment of the present invention, neighboring buttons are selected only when a pre-determined velocity is achieved when dragging the mouse. Therefore, general, slow-moving motion of the mouse would not result in any buttons being inadvertently being selected. Another embodiment of the present invention would require that a pre-determined degree of acceleration must be achieved before selections of neighboring buttons are made.

Figure 4A:
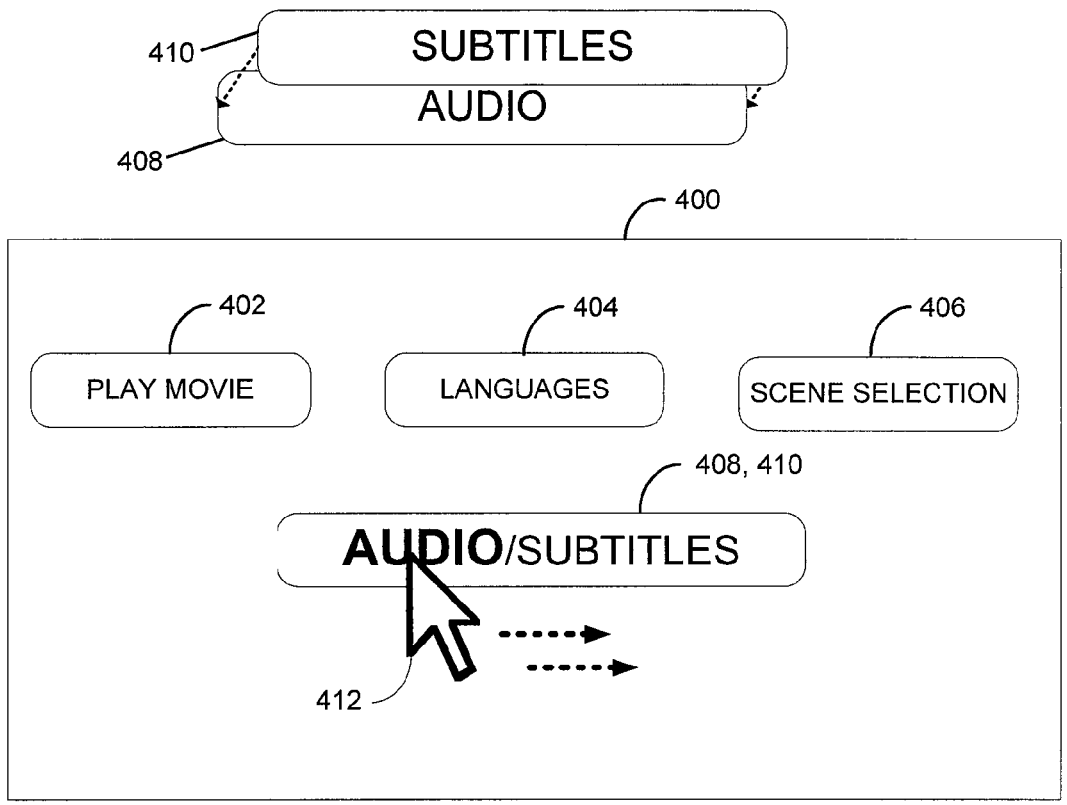
FIG. 4A depicts one embodiment for selecting between multiple buttons overlaid on one another by dragging a mouse.
Figure 4B:
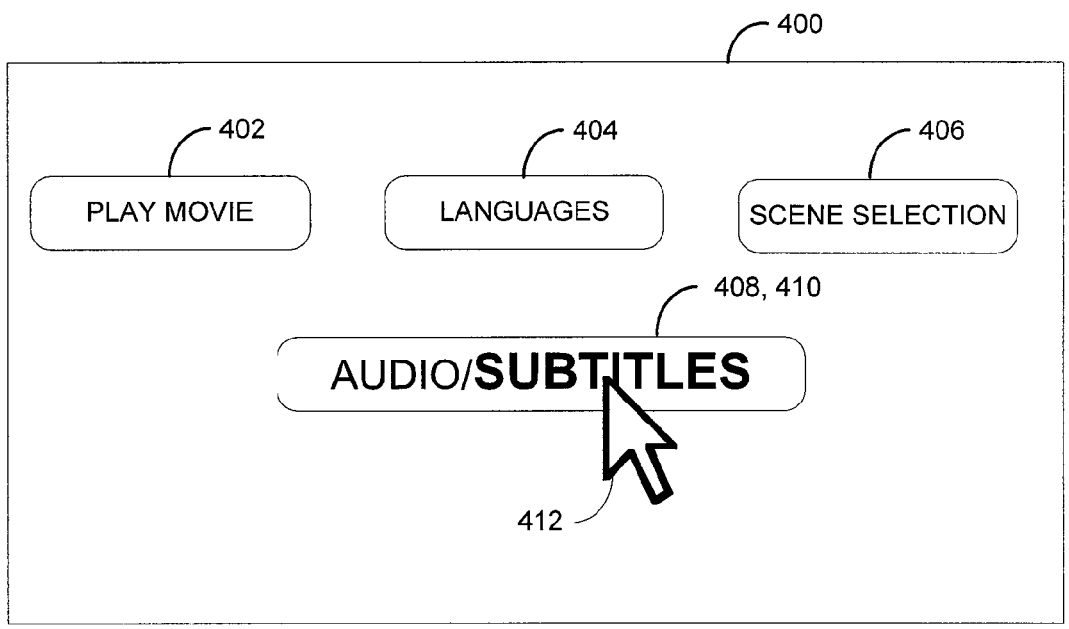
FIG. 4B depicts the selection of one button between multiple buttons overlaid on one another by dragging a mouse.

Reference is now made to FIGS. 4A and 4B, which depicts one embodiment for making a selection by dragging a mouse within a multi-page menu where multiple buttons are overlaid on one another. In one embodiment of the present invention, a drag feature of the mouse is used to address or handle the circumstance where two buttons are physically located at the same x-y coordinates (i.e., overlaid on one another). Such a condition is illustrated in FIGS. 4A and 4B, in which two buttons 408, 410 are overlaid directly on top of each other and visibly present "Audio/Subtitles." In one instance, the "Audio" button 408 is emphasized (FIG. 4A), while in the other instance the "Subtitles" button 410 is emphasized (FIG. 4B). In a situation where the "Audio" button 408 is selected, the mouse may be used to select the other button ("Subtitles" 410) by dragging the mouse to the right. As will be appreciated, the "drag" operation of a mouse may be performed by depressing (but not releasing) the left mouse key, and while holding the left mouse key in its depressed position, moving the mouse to the right. Conversely, if the "Subtitles" button 410 is selected, the "Audio" button 408 may be selected by dragging the mouse to the left. In this regard, the drag operation can be used by a mouse to have the effect of selecting the neighboring button (of a currently selected button), in the direction that the mouse is dragged. In the example just presented, only two buttons existed, with one button having only a right neighbor and the other button having only a left neighbor. As illustrated in FIG. 3 above, the drag feature of the mouse can be used to select among two or more buttons in a similar fashion.

As stated above, another circumstance requiring special handling of buttons may involve the presence of buttons that are not visible or transparent to the user on a given page. This condition can be readily detected by evaluating a transparency value of a button (or other appropriate parameter) to determine whether the button is visible to the user. Upon identification or detection of transparent buttons, such buttons would be identified as buttons requiring special handling. In connection with the third condition indicated above (buttons that are too small for the user to see), it is appreciated that buttons must be presented with a certain realistic size in order to be visible or discernable to a user. Therefore, in a circumstance where, for example, a button is detected having a very small dimension (e.g., 2×2 pixels), such a condition would also result in the button being identified as a special button. Generally, these buttons cannot be intentionally selected through conventional use of a mouse (e.g., "click-and-point" action), because they are not visible to a user since they are either too transparent or too small to see.

Figure 5:
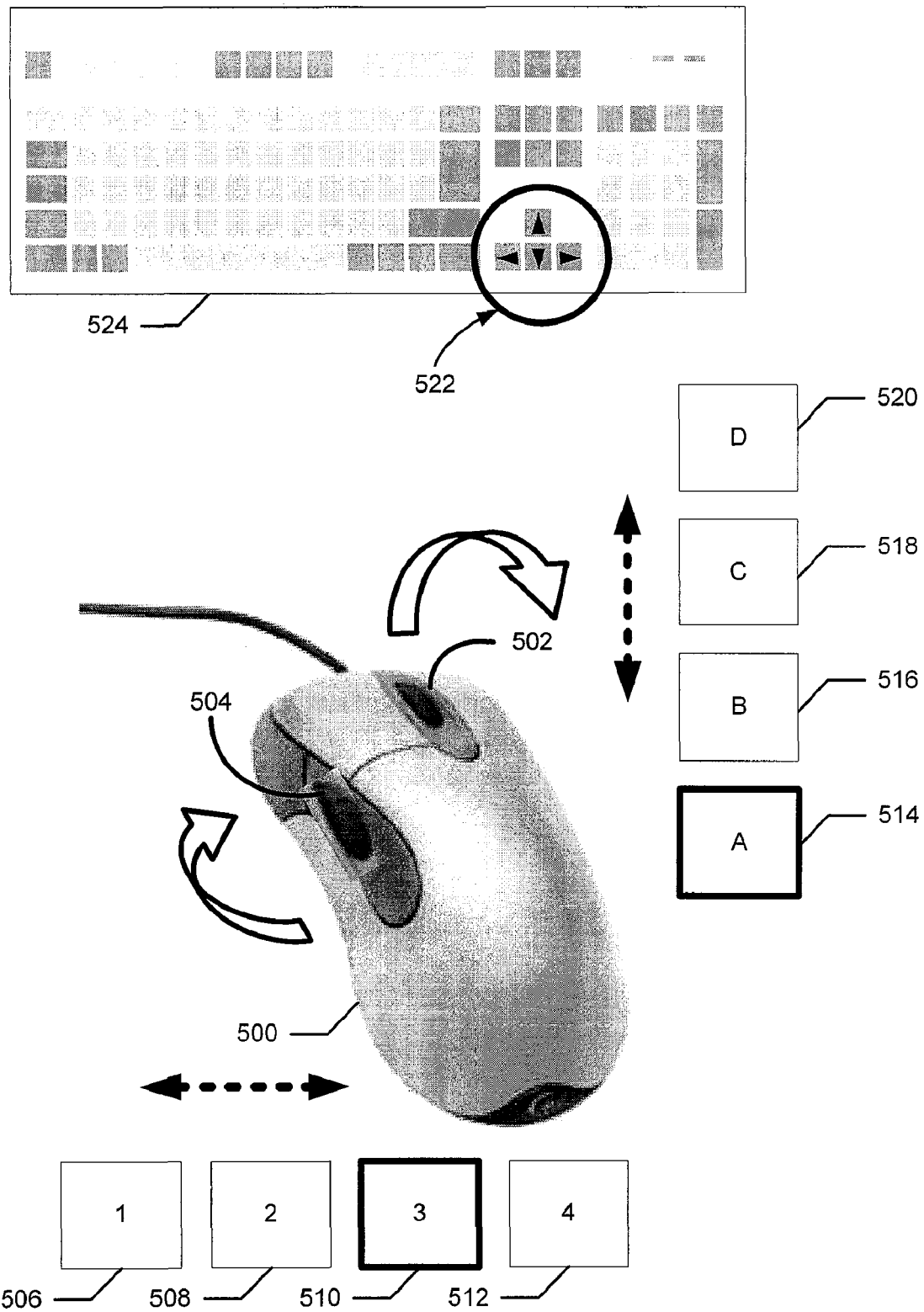
FIG. 5 depicts one embodiment for selecting transparent buttons or buttons that are extremely small in size.

In another embodiment of the present invention, a mouse wheel can be used to affect the selection of these special buttons. In this regard, mouse devices are known to include one or two wheels. Referring to FIG. 5, a mouse has a first wheel 502 that is located between the left and right mouse keys, and a second wheel 504 that is located on the thumb (or left) side of the mouse. The first mouse wheel 502 may be used to implement the up-down arrow keys of a corresponding remote control or computer keyboard 524, and the second mouse wheel 504 may be used to implement the left-right arrow keys. As an illustration, suppose buttons A, B, C and D 514, 516, 518, 520 are arranged in a vertical fashion as illustrated in FIG. 5. To select one of the buttons, the first mouse wheel 502 would be rotated. If button A 514 was initially selected, buttons B, C or D could be selected by rotating the first mouse wheel away from the user to emulate use of the up arrow on a remote control. Likewise, if button D 520 was initially selected, buttons C, B, or A 518, 516, 514 could be selected by rotating the first mouse wheel toward the user to emulate a down arrow on a remote control.

The second mouse wheel 504 (i.e., the thumb wheel) may be used to implement left-arrow and right-arrow operations of the remote control. As an illustration, suppose buttons 1, 2, 3 and 4 506, 508, 510, 512 are arranged in a horizontal fashion as illustrated in FIG. 5. To select one of the buttons, the second mouse wheel 504 would be rotated. If button 3 510 was initially selected, buttons 1 or 2 506, 508 could be selected by rotating the thumb wheel toward the user to emulate use of the left arrow on a remote control. Likewise, to select button 4 512, the user would rotate the thumb wheel away from the user to emulate a right arrow on a remote control.

In some embodiments of the present invention, a single mouse wheel may be used to perform the same functionality as the two mouse wheels discussed above. In this instance, a mouse key (or mouse wheel) may be clicked to toggle between an up/down selection mode and a left/right selection mode. For example, in referring back to FIG. 5, suppose that a user initially uses a mouse wheel 502 located between the left and right mouse keys to select buttons A, B, C and D 514, 516, 518, 520, which are arranged in a vertical arrangement. If the user decided that he wanted to select buttons 1, 2, 3 and 4 506, 508, 510, 512, which are arranged in a horizontal fashion, he would simply click on a mouse key (or simply click the mouse wheel itself) to toggle to a new mode. Now, rotating the wheel would allow the user to make selections in a left/right manner. This is achieved using a single mouse wheel.

Figure 6:
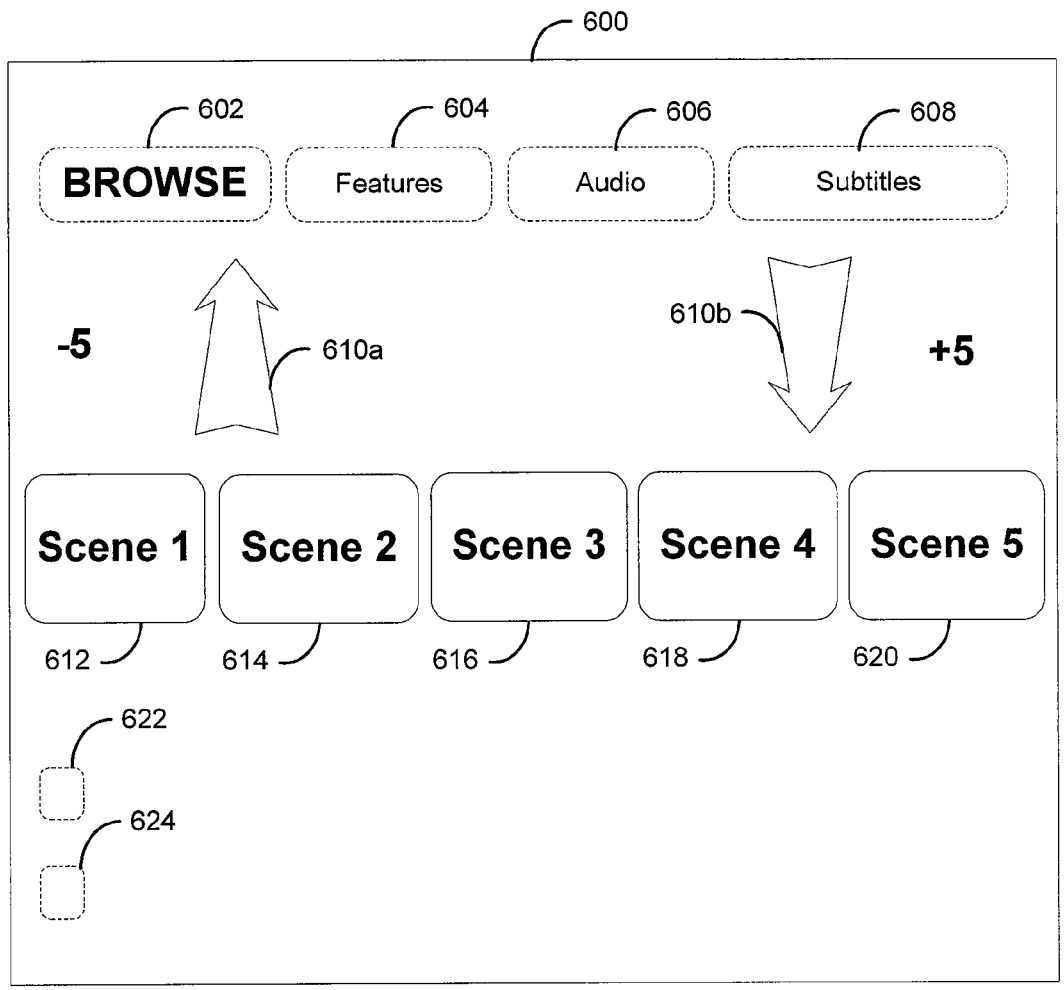
FIG. 6 depicts a scene selection page with transparent buttons.

As an example of selecting transparent buttons, FIG. 6 illustrates a scene selection page to a user. In this page, five selectable buttons 612, 614, 616, 618, 620 are visibly presented to the user. The buttons 602, 604, 606, 608 presented across the top, in this example, are disabled and therefore not selectable by the user. The visibly selectable buttons 612, 614, 616, 618, 620 include images from different scenes of the video. The user may select each of these buttons in sequence by using the left-arrow or right-arrow keys on a remote control. The user could likewise use a mouse to select each of these buttons by rotating the thumb wheel 504 (FIG. 5) or dragging the mouse (see FIG. 3).

In addition, a feature may be provided, whereby a user may, for example, by depressing the up-arrow or down-arrow keys of a remote control device skip forward or backward five images at a time. While visible buttons 610a, 610b may be displayed to reflect this option to the user, transparent buttons 622, 624 (which perform the same action of skipping forward/backward five images) may be provided in some potentially obscure location of the page such that the user is totally unaware of their presence. Furthermore, such transparent buttons may be very small in size. Therefore, using the conventional "point-and-click" feature of the mouse would not be sufficient since the user cannot see the buttons.

One key aspect of embodiments of the present invention is the fact that users can select these transparent (i.e., "special") buttons without knowing the precise location of the buttons. As discussed in FIG. 5, one embodiment of the present invention would involve the use of one or two mouse wheels to select buttons. In the current example (FIG. 6), each visibly selectable button 612, 614, 616, 618, 620 presented on the page could have transparent button 622 associated as its neighbor in the up direction, and transparent button 624 associated as its neighbor in the down direction. Therefore, no matter which visibly-selectable button is selected, rotating the first mouse wheel 502 away from the user results in immediate activation of transparent button 402 (similar to pressing the up-arrow key of a remote control), which results in a new page being presented to the user showing the next five selectable scene image buttons.

In yet another embodiment of the present invention, a context menu may be invoked by clicking the right mouse key when the mouse is positioned over a particular button so as to select that corresponding button. Depressing the right mouse key to invoke the context menu could result in, for example, a graphical display being presented. The context menu may, for example, be a graphical menu displaying arrows that illustrate directions in which the mouse may be used to effectively emulate the corresponding arrow keys of a remote control.

Figure 7:
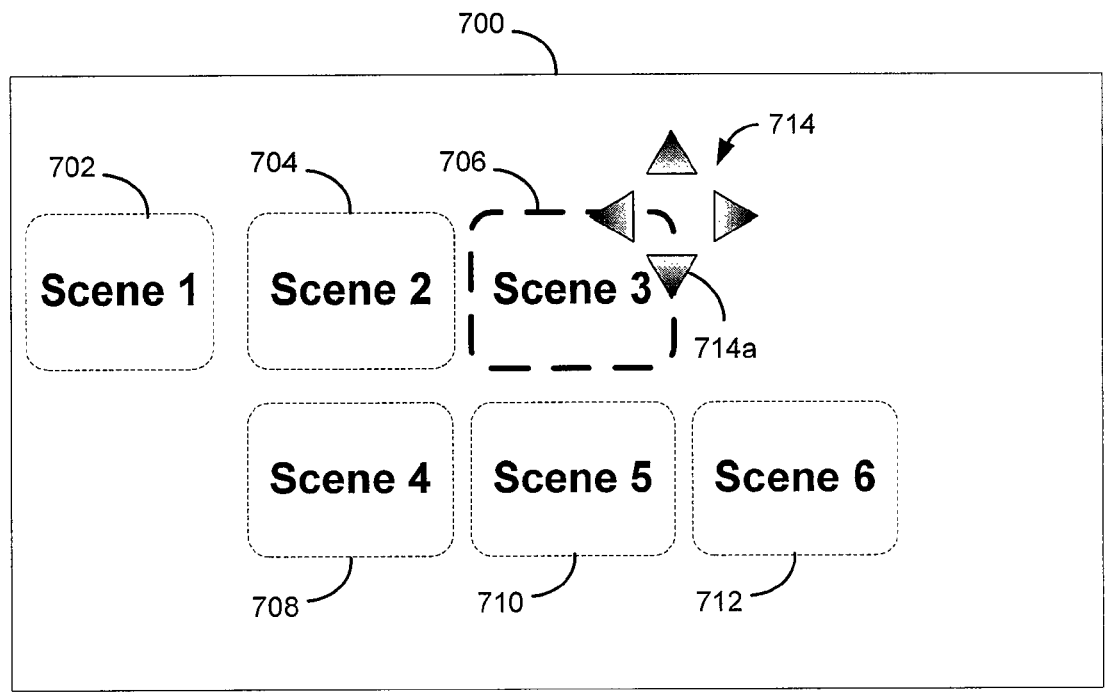
FIG. 7 depicts one embodiment for generating a context menu upon positioning the mouse over a button and depressing a mouse key.

Referring to FIG. 7, when a button 706 is selected, if that button 706 has defined neighboring buttons, then the activation of the right click on the mouse will result in arrows 714 being presented that allow the mouse to effectively implement the arrow operations in the directions of the two neighboring buttons. In some embodiments of the present invention, the arrows 714 are displayed only if the mouse is positioned somewhere over the button 706. In other embodiments of the present invention, the arrows 714 are displayed over the button that is currently selected (e.g., highlighted) regardless of where the mouse is currently positioned within the page. These graphical arrows displayed over the button 706 function as a "virtual keyboard" which the user uses to navigate to other buttons on the page.

In FIG. 7, "Scene 3" 706 has two neighboring buttons: "Scene 2" 704 and "Scene 5" 710. Activation or implementation of these arrow keys similar to those on a remote control could be implemented by, for example, moving the mouse over the arrow key desired and pressing the left mouse button (i.e., left-clicking the mouse over the arrow desired). In the example illustrated in FIG. 7, moving the mouse over the down-pointing arrow 714a and left-clicking on that arrow causes the button of "Scene 5" 710 to be selected.

Yet another embodiment may be implemented similar to the embodiment described above. In this embodiment, when a page is displayed, the system analyzes every button on the page and determines which buttons require special operations (i.e., buttons with neighboring buttons, such that dragging of the mouse or rotation of the mouse wheels result in selection of a defined neighboring button). This embodiment may be implemented using a graphical overlay in connection with each button having a defined neighboring button. It should be appreciated that these graphic overlays are not part of the content of the video disc, but are rather dynamically drawn by the application (being executed on the computer) that enables the viewing of the video disc.

Figure 8A:
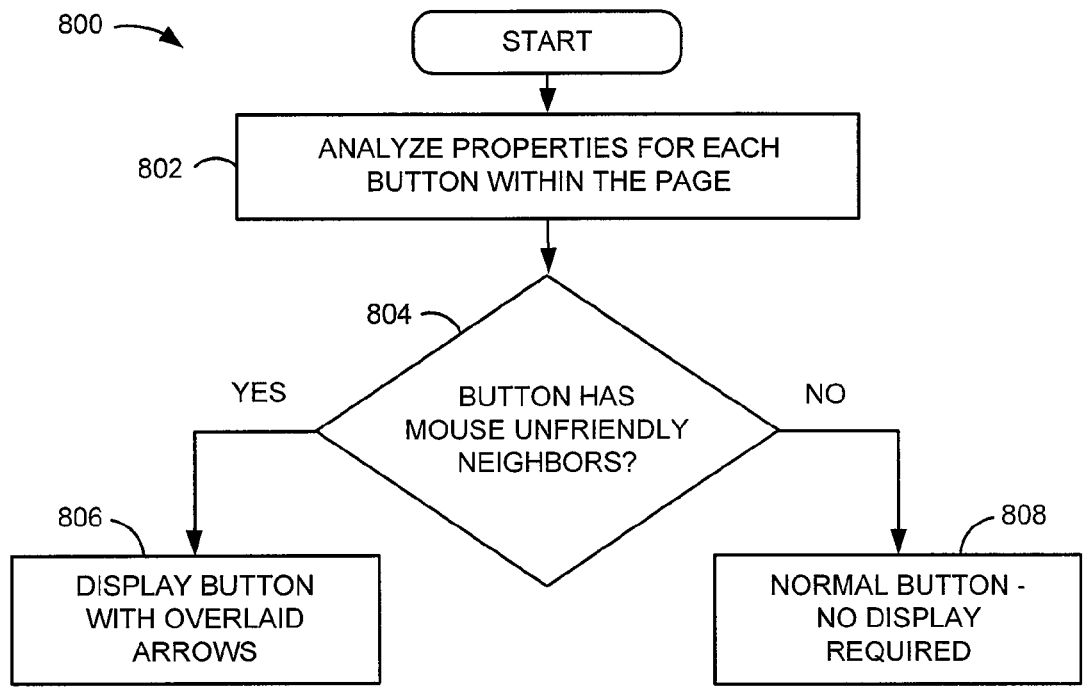
FIG. 8A depicts top level functional operation of a method for generating a context menu as soon as a new page is displayed.

In one implementation, all such special graphics could be displayed when the page is first displayed for a given period of time, or as soon as a new page is displayed. Reference is now made to FIG. 8A, which depicts top level functional operation of a method for generating a context menu as soon as a new page is displayed. In block 802, every button in a page is analyzed as soon as a new page is displayed. In step 804, if the button has neighbors that are special buttons (e.g., neighboring buttons that are transparent, too small, etc.), then a context menu is generated. In this case, graphical arrows are overlaid on top of the block as seen in step 806. If the button is not a special button, then no display is required (step 808).

Figure 8B:
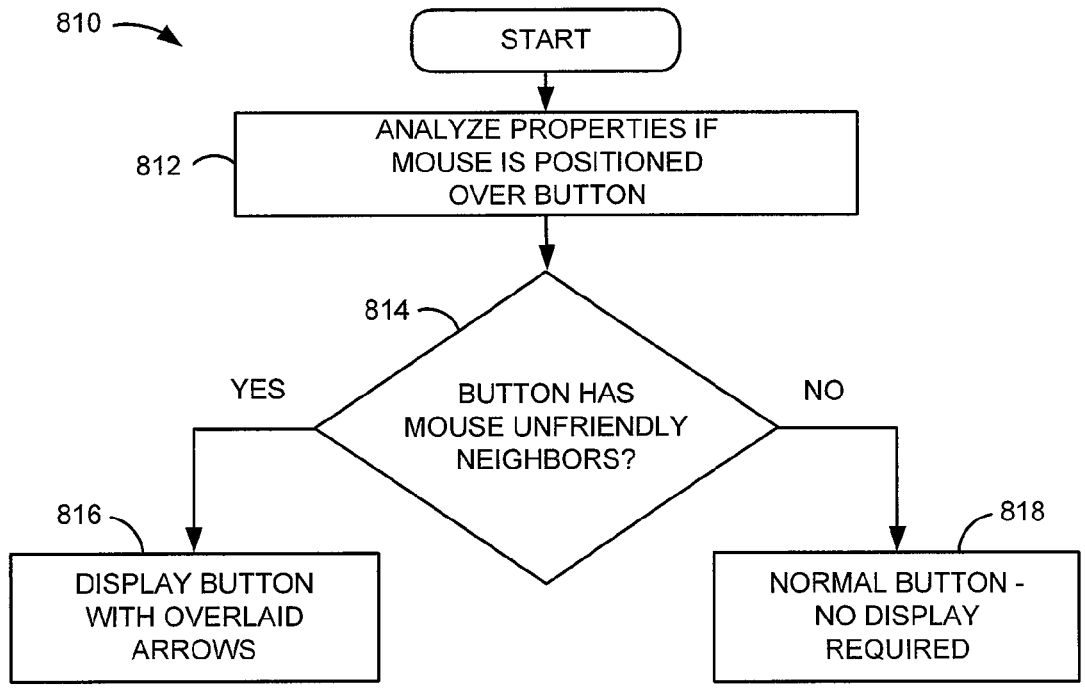
FIG. 8B depicts top level functional operation of a method for generating a context menu for a particular button only when the mouse is positioned over the button.

In another implementation, special graphics are displayed only when the mouse is positioned over a particular button. The overlying application can detect the alignment of the mouse pointed with a corresponding button and at that time cause the graphic overlay to be presented showing, for example, arrows in the directions of legitimate neighboring buttons. The corresponding arrow key operation (if depressed from a remote control) can be implemented by using the mouse by aligning the mouse pointer with the corresponding arrow and, for example, left clicking on that graphic arrow overlay. FIG. 8B depicts top level functional operation of a method for generating a context menu for a particular button only when the mouse is positioned over the button. In block 812, a button is analyzed only if the mouse is positioned over the button. In step 814, if the button has neighbors that are special buttons (e.g., neighboring buttons that are transparent, too small, etc.), then a context menu is generated. In this case, graphical arrows may be overlaid on top of the block as seen in step 816. If the button is not a special button, then no display is required (step 818).

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A method for selecting between a plurality of buttons in a page within a video playback system for implementing remote control functions with a standard input/output device, the method comprising the steps of:

receiving a plurality of buttons from one or more pages in a video content, wherein the buttons are originally designed for selection via a remote control, wherein the buttons are incompatible with the standard input/output device other than the remote control, and wherein the buttons comprise selectable buttons and non-selectable buttons;

identifying all of the selectable buttons within the page;

defining positions of all of the selectable buttons within the page according to the identified buttons comprising at least a first button and a second button;

receiving a depression of a key on the standard input/output device while the standard input/output device is positioned over the first button currently selected;

receiving dragging of the standard input/output device in the direction of the second button to be selected while the key is depressed;

detecting release of the key on the standard input/output device once the standard input/output device is positioned over the second button; and responsive to the release detection, selecting the second button.

2. The method of claim 1, wherein at least two of the selectable buttons corresponding to different actions are overlaid on top of each other.

3. The method of claim 1, wherein detecting releasing the key on the standard input/output device selects and activates the button.

4. The method of claim 1, further comprising detecting a click of the key on the standard input/output device and responsive to occurrence of the click detection while the second button is selected, activating the second button.

5. The method of claim 1, wherein the selecting the second button comprises setting the second button to a selected state and then to an activated state.

6. The method of claim 1, wherein selecting the second button is also responsive to the second button being identified as a neighbor of the first button.

7. A method for selecting between a plurality of buttons in a page within a video playback system for implementing remote control functions with a standard input/output device, the method comprising the steps of:

receiving a plurality of buttons from one or more pages in a video content, wherein the buttons are originally designed for selection via a remote control, wherein the buttons are incompatible with the standard input/output device other than the remote control, and wherein the buttons comprise selectable buttons and non-selectable buttons;

identifying all of the selectable buttons within the page;

defining positions of all of the selectable buttons within the page according to the identified buttons comprising at least a first button and a second button;

visibly distinguishing the first button in a selected state among the selectable buttons;

receiving dragging of the standard input/output device in the direction of the second button to be selected; and selecting the second button responsive to detecting cessation of movement of the standard input/output device.

8. The method of claim 7, wherein receiving dragging of the standard input/output device results in other buttons located within the page between the first button and the second button being selected.

9. The method of claim 8, wherein a new button is selected only when a pre-determined number of pixels within the page have been traversed by receiving dragging of the standard input/output device.

10. The method of claim 8, wherein a new button is selected only when the standard input/output device is dragged in an accelerated fashion.

11. The method of claim 8, wherein a new button is selected only when the standard input/output device is dragged beyond an edge within the page.

12. The method of claim 7, further comprising:

hiding a pointer that is associated with the standard input/output device and that is normally displayed on the page.

13. A method for selecting between a plurality of buttons in a page within a video playback system for implementing remote control functions with a standard input/output device, the method comprising the steps of:

receiving a plurality of buttons from one or more pages in a video content, wherein the buttons are originally designed for selection via a remote control, wherein the buttons are incompatible with the standard input/output device other than the remote control, and wherein the buttons comprise selectable buttons and non-selectable buttons;

identifying all of the non-discernible buttons within the page;

in response to rotation of a wheel on the standard input/output device, selecting a second one of the non-discernible buttons based on the direction of rotation and on the relative position of the first one of the non-discernible buttons.

14. The method of claim 13, wherein the second button is aligned along a common axis with the first button.

15. The method of claim 13, further comprising the steps of:

detecting rolling of another wheel on the standard input/output device; and selecting buttons that are orthogonal to the axis on which the first button and second button are aligned.

16. The method of claim 15, wherein rolling the wheel results in selecting buttons in a left and right fashion and rolling the another wheel results in selecting buttons in an up and down fashion.

17. The method of claim 13, wherein depressing a button on the standard input/output device results in buttons being selected in a direction that is orthogonal with respect to a direction in which the buttons were selected prior to depressing the button.

18. The method of claim 13, wherein at least some of the non-discernible buttons in the page are transparent.

19. The method of claim 13, wherein at least some of the buttons in the page are smaller than a pre-defined size.

20. A method for selecting between a plurality of buttons in a page within a video playback system for implementing remote control functions with a standard input/output device, the method comprising the steps of:

receiving a plurality of buttons from one or more pages in a video content, wherein the buttons are originally designed for selection via a remote control, wherein the buttons are incompatible with the standard input/output device other than the remote control, and wherein the buttons comprise selectable buttons and non-selectable buttons;

identifying all of the selectable buttons within the page;

defining positions of all of the selectable buttons within the page according to the identified buttons comprising at least a first button and a second button;

detecting positioning of the standard input/output device over one of the selectable buttons; and displaying a context menu upon receiving a depression of a key on the standard input/output device, the context menu presenting a user with possible actions that can be performed in relation to the button.

21. The method of claim 20, wherein displaying the context menu upon receiving a depression of a key on the standard input/output device occurs when the standard input/output device is positioned over one of the selectable buttons.

22. The method of claim 20, wherein the graphical display is comprised of arrows which allow the user to select neighboring buttons by clicking on the arrows.

23. The method of claim 20, wherein the context menu is comprised of a pop-up menu presenting a list of actions that can be executed in relation to the button.

24. The method of claim 20, wherein at least one of the possible actions is navigating to another one of the selectable buttons.

25. A method for selecting between a plurality of buttons in a page within a video playback system for implementing remote control functions with a standard input/output device, the method comprising the steps of:

receiving a plurality of buttons from one or more pages in a video content, wherein the buttons are originally designed for selection via a remote control, wherein the buttons are incompatible with the standard input/output device other than the remote control, and wherein the buttons comprise selectable buttons and non-selectable buttons;

identifying all of the selectable buttons within the page;

defining positions of all of the selectable buttons within the page according to the identified buttons comprising at least a first button and a second button;

determining the properties for each selectable button within the page;

overlaying a graphic display over each selectable button, the graphic display presenting to a user actions that can be performed in relation to the button based on the properties of the button.

26. The method of claim 25, wherein the graphic display is comprised of arrows that allow the user to select neighboring buttons.

27. The method of claim 25, wherein the step of overlaying the graphic display is performed only after the page has been displayed for a pre-defined period of time.

28. The method of claim 25, wherein the step of overlaying the graphic display is performed immediately after a page is displayed.

29. The method of claim 25, wherein the step of overlaying the graphic display is performed only when the standard input/output device is positioned over a particular button.

30. A method for selecting between a plurality of buttons in a page within a video playback system for implementing remote control functions with a standard input/output device, the method comprising the steps of:

receiving a plurality of buttons from one or more pages in a video content, wherein the buttons are originally designed for selection via a remote control, wherein the buttons are incompatible with the standard input/output device other than the remote control, and wherein the buttons comprise selectable buttons and non-selectable buttons;

identifying all of the selectable buttons within the page;

defining positions of all of the selectable buttons within the page according to the identified buttons comprising at least a first button and a neighboring button;

visibly distinguishing the first button in a selected state among the selectable buttons;

receiving dragging of the standard input/output device in a circular fashion in the clockwise direction; and selecting a neighboring button on one side of the first button.

31. The method of claim 30, wherein receiving dragging of the standard input/output device in a circular fashion in the counter-clockwise direction results in the selection of a neighboring button on the opposite side of the first button.

* * * * *